Oct. 16, 1956  W. DUSZYNSKI  2,766,793
VEGETABLE SLICER HAVING ADJUSTABLE CUTTING MEMBER
Filed Sept. 8, 1953
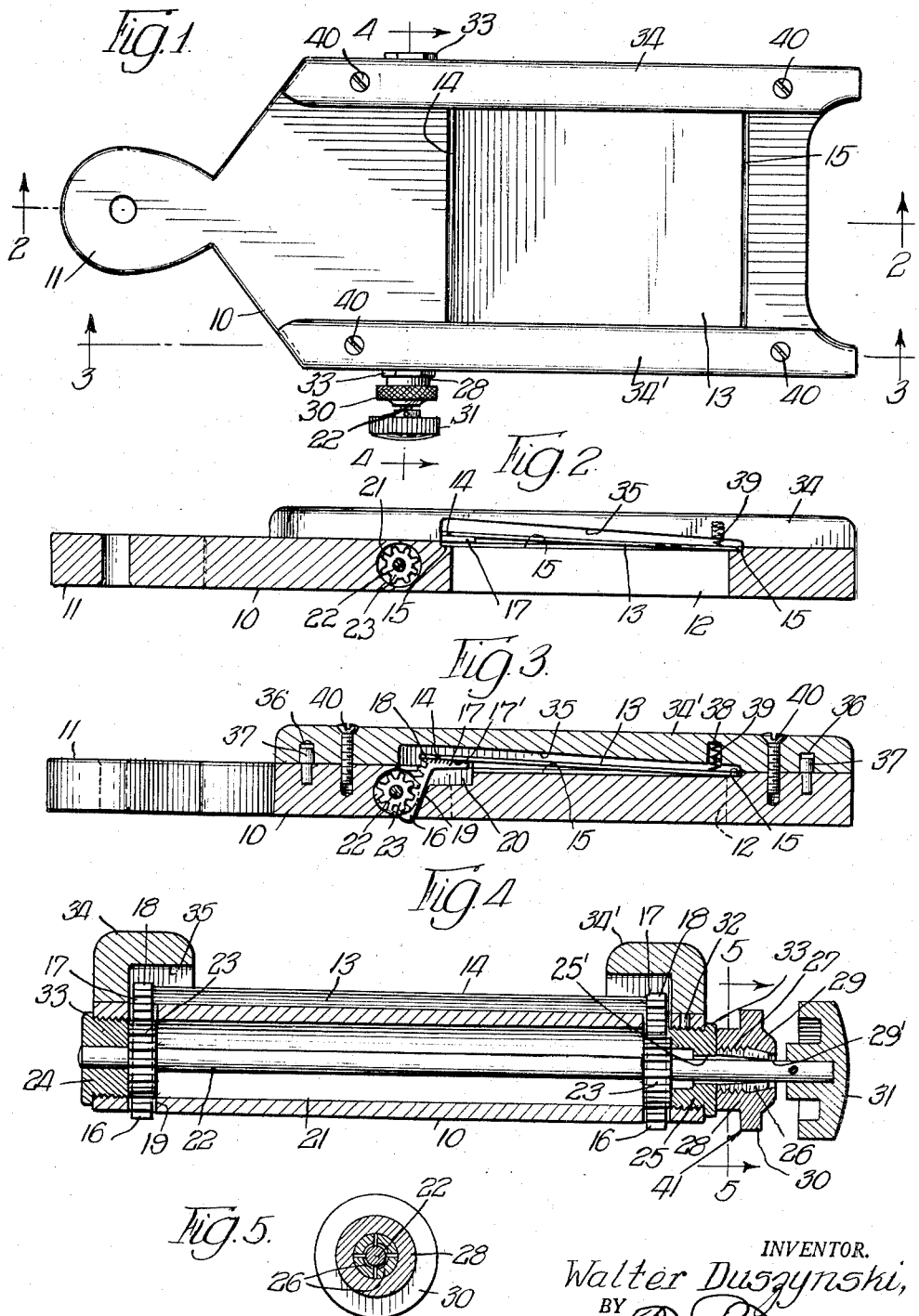
INVENTOR.
Walter Duszynski,
BY

United States Patent Office 2,766,793
Patented Oct. 16, 1956

2,766,793

VEGETABLE SLICER HAVING ADJUSTABLE CUTTING MEMBER

Walter Duszynski, Chicago, Ill.

Application September 8, 1953, Serial No. 378,803

4 Claims. (Cl. 146—170)

The present invention relates to vegetable slicers and has for its main object the provision of a slicer wherein the cutting knife may be regulated for the purpose of regulating the thickness of the cut slices.

Another object of the present invention is the provision of efficient and positive means for locking the knife in its adjusted position.

A still further object of the present invention is the provision of a cutting knife with an integrally formed one or more rack bars engageable by one or more gears, the latter actuable by a shaft to which said gears are keyed, for the purpose of shifting the knife to or away from the board for the purpose of regulating the width of a crevice between the blade and the board and for regulating thereby the thickness of slices to be cut, with means coacting with the shaft for locking the latter in its adjusted position so as to maintain the cutting blade in its adjusted position with relation to the board.

A still further object of the present invention is the provision of a chuck mechanism in connection with the shaft aforesaid for the purpose of locking the same in position to maintain thereby the cutting knife rigid in its adjusted position.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views:

Fig. 1 is a plan elevational view of the present slicer;

Fig. 2 is a longitudinal cross sectional view therethrough, taken on line 2—2 of Fig. 1;

Fig. 3 is a longitudinal cross sectional view through the slicer taken on line 3—3 of Fig. 1;

Fig. 4 is an enlarged transverse cross sectional view through the slicer taken on line 4—4 of Fig. 1; and Fig. 5 is a cross sectional view through the chuck mechanism taken on line 5—5 of Fig. 4.

Referring in detail to the present drawing there is shown therein board 10 substantially of a rectangular formation, having at one of its ends an integrally formed centrally positioned handle 11. Adjacent the opposite end said board 10 is provided with a rectangular opening 12. Superimposed upon the upper surface of said board 10 in a closing relation with opening 12 is plate 13 preferably made of metal.

The front edge of said plate 13 which is in a transverse relation with board 10 and disposed nearest to said handle 11 is sharpened to define knife 14.

The perimeter of the body portion of said board 10 adjacent opening 12 and adjacent the upper surface of said board 10 is provided with recess 15 for accommodating therewithin edge of plate 13. The depth of said recess 15 substantially corresponds to the thickness of plate 13 so that when plate 13 and knife 14 remain in an inoperative position the edge of said plate 13 enters said recess 15 and remains flush with the upper surface of board 10. The combined width of the transverse portions of said recess 15 and opening 12 longitudinally with relation to board 10 is greater than the length of said plate 13 permitting shifting movement of said plate 13 in a longitudinal relation with board 10, and particularly of the rear edge of said plate 13 within the rear portion of recess 15, for the purpose hereinafter specified.

The device further includes a pair of rack bars 16, which are positioned in an oblique transverse relation with board 10, each adjacent the longitudinal edge of said board. At its upper end each rack bar 16 has an integrally formed extension 17, which is soldered, welded as at 17' or otherwise rigidly affixed partly to the longitudinal edge of plate 13 and partly to ear 18 extending from each longitudinal edge of plate 13 forwardly of knife 14.

Adjacent each longitudinal edge, board 10 is provided with a transverse oblique recess 19 for accommodating therewithin for shifting movement said rack bar 16. Recess 19 merges adjacent each longitudinal edge of plate 13 with recess 20 for accommodating therewithin in its shifting movement said extension 17.

Transversely of said board 10 in an edge to edge relation therewith there is bore 21 made in said board 10, in a central relation with which shaft 22 is positioned. Said shaft has a pair of gears 23 keyed thereto, one adjacent each side edge of board 10. The teeth of each of said gears 23 are in mesh with the teeth of each rack bar 16, as is best shown in Fig. 3. The body portion of board 10 adjacent each end of said bore 21 is threaded. Receivable within one end of said bore 21 in a threaded relation with the body portion of board 10 is threaded plug 24, through which the adjacent end of said shaft 22 is extended. Thus said plug 24 acts as a bearing for that end of shaft 22.

Receivable in a threaded relation with the body portion of board 10 adjacent the opposite end of said bore 21 is another plug 25, which is provided with an aperture 25' through which the adjacent end of shaft 22 is extended. Integrally formed with the outer end of said plug 25, in a concentric relation therewith, and arranged around shaft 22, is a plurality of tines 26, the inner ends of which are externally threaded, as at 27, for receiving therearound in threaded engagement ring 28. The outer faces of said tines 26, adjacent their free ends, are tapered, as at 29 to be engaged by the bevel of the constricted mouth 29' made adjacent the outer end of said ring 28. Said ring 28 is provided with a circumferential knurled flange 30, whereby said ring 28 may be manually shifted upon threads 23 towards or away from said plug 25. When said ring has been shifted towards said plug 25 to the maximum extent, as seen in Fig. 4, the bevel of the constricted mouth at the outer end of said ring 28 bearing against tapered surfaces of the outer ends of tines 26 compresses the latter toward shaft 22 and brings about a firm grip for preventing rotary shifting movement of shaft 22 in either direction. When however said ring 28 is loosened shaft 22 may be rotated in either direction by manual operation of knob 31 rigidly affixed to the end of said shaft 22.

In order to prevent plug 25 with its tines 26 from shifting in either direction during the manipulation of the chuck, including said ring 28, pin 32 is driven through the body portion of board 10 in a transverse relation with said plug 25 to firmly engage the latter and prevent the rotary movement thereof, once said plug 25 remains in an operative position within the adjacent end of bore 21, as is seen in Fig. 4.

When ring 28 is loosened tines 26 are out of engagement with shaft 22 permitting the rotation of the latter by manipulating knob 31 in either direction. This will rotatably shift shaft 22 for shifting rack bars 16 in a transverse relation with board 10 within their recesses 19, for the ultimate purpose of raising or lowering knife 14 with relation to the upper surface of board 10. Obviously, when said knife 14 is shifted farther from board 10 a greater space between knife 14 and the body of board 10 will be created for permitting cutting of thicker vegetable slices by said knife 14. Conversely when knife 14 has been shifted toward board 10 the space between the knife and the board will become smaller permitting the knife to cut thinner vegetable slices. When said knife 14 has been adjusted for the desired thickness of vegetable slices chuck mechanism generally indicated by 41 in Fig. 4 is then operated by manually turning flange 30 for driving ring 28 toward plug 25 in order to lock shaft 22 to the board and prevent shifting movement of shaft 22 in either direction. This will of course lock knife 14 in its adjusted position through the interengaged rack bars 16 and gears 23.

It is observed that due to the inclined position of rack bars 16 and their resting by their backs upon the adjacent body portions of board 10 adjacent said recesses 19, the upright shifting movement of said rack bars 16 by the operation of gears 23 will necessarily shift plate 13 and knife 14 either forwardly or rearwardly of the board, depending on whether knife 14 is shifted toward board 10 or away from it, respectively.

The rear edge of plate 13 will of course shift within the rear portion of recess 15. By virtue of this arrangement the rear end of plate 13 will always remain within longitudinal or transverse portions of recess 15 and thereby at all times in an operative position with board 10 no matter whether the forward edge with knife 14 is shifted toward or away from board 10. By this arrangement plate 13 is prevented from either lateral or longitudinal disarrangement with relation to board 10 during the shifting movement of said rack bars 16.

Plugs 24 and 25 adjacent their outer ends are provided with polygonal outwardly extending flanges 33 which may be engaged by a socket wrench or any other suitable tool in order to drive said plugs into the respective ends of said bore 21 and to threadedly engage the same with the adjacent body portions of board 10. While plug 24 acts as a bearing for the adjacent end of shaft 22, the opposite plug 25 acts as a bearing for the opposite end of said shaft 22.

Coacting with each edge of board 10 in a superimposed relation is frame member 34 and 34', each of which adjacent its inner edge is provided with a tapering recess 35. Adjacent its front end recess 35 is wider in a transverse relation with said frame members 34 and 34', while the rear end of said recess 35 is narrower, for the purpose of accommodating therewithin the side edges of plate 13 in their angular movement when the forward end of said plate 13, including knife 14, is shifted to or away from the board as was already described.

Each of said frame members 34 and 34' adjacent each of its ends is provided with bore 36 within which the upper end of locating pin 37 is receivable. The two pins 37 adjacent each end of board 10 are driven into the board and remain in a rigid relation therewith.

Adjacent the rear end each of said frame members 34 and 34' are provided with bore 38, within which coil spring 39 is received, and within which the latter is capable of being compressed. The two of said springs 39 bear against the rear end of plate 13 one adjacent each side edge thereof for the purpose of maintaining the rear edge of said plate within recess 15. A pair of screws 40 driven through each of said frame members 34 and 34' engage board 10, and maintain the former in a rigid relation with the board, thereby further maintaining springs 39 in their operative position with plate 13.

While there is described herein preferred embodiments of the present invention, it is nevertheless to be understood that minor changes may be made therein without departing from the spirit and scope of the invention as claimed.

What I claim as new is:

1. A vegetable slicer comprising a board provided with an opening therethrough and having a transverse recess therein adjacent said opening, a plate in a superposed relation with said board above said opening, one edge of said plate defining a knife, a rack bar depending from said plate adjacent one end thereof and extending transversely through the board in the recess and bearing against the side of the recess toward the opposite end of the plate in position for holding the plate against endwise sliding movement, a shaft supported by said board, and a gear carried by said shaft and meshing with said rack bar for shifting the knife toward or away from the board upon rotary movement of the shaft in either direction.

2. A vegetable slicer comprising a board provided with an opening therethrough and recesses extending transversely of the board on opposite sides of said opening, an elongated plate in a superposed relation with the board above said opening, means at one end of the plate normally tending to maintain said end of the plate in position on the board, rack bars depending from the opposite end of the plate and extending transversely through the board in the transverse recesses and bearing against the side of the recesses toward the first-mentioned end of the plate for holding the plate against endwise sliding movement, a shaft supported by the board, and gears carried by the shaft and meshing with the rack bar for shifting the knife toward or away from the board upon rotary movement of the shaft.

3. A vegetable slicer comprising a board provided with an opening therethrough and recesses extending transversely of the board on opposite sides of said opening, an elongated plate in a superposed relation with the board above said opening, means at one end of the plate normally tending to maintain said end of the plate in position on the board, rack bars depending from the opposite end of the plate and extending transversely through the board in the transverse recesses and bearing against the side of the recesses toward the first-mentioned end of the plate for holding the plate against endwise sliding movement, a shaft supported by the board, gears carried by the shaft and meshing with the rack bar for shifting the knife toward or away from the board upon rotary movement of the shaft, and means carried by the board for locking the shaft to the board and thereby holding the knife in its adjusted position with respect to the board.

4. A vegetable slicer comprising a board provided with an opening therethrough and recesses extending transversely of the board on opposite sides of said opening, an elongated plate in a superposed relation with the board above said opening, means at one end of the plate normally tending to maintain said end of the plate in position on the board, rack bars depending from the opposite end of the plate and extending transversely through the board in the transverse recesses and bearing against the side of the recesses toward the first-mentioned end of the plate for holding the plate against endwise sliding movement, a shaft supported by the board, gears carried by the shaft and meshing with the rack bar for shifting the knife toward or away from the board upon rotary movement of the shaft, a chuck supported by the board for tightening adjustment with respect thereto, and means on the shaft in cooperative relation with the chuck for locking the shaft in adjusted position upon tightening of the chuck and thereby holding the knife in its adjusted position with respect to the board.

References Cited in the file of this patent

UNITED STATES PATENTS

| | | |
|---|---|---|
| 148,740 | Nittenger | Mar. 17, 1874 |
| 1,663,776 | Rossow | Mar. 27, 1928 |
| 1,809,824 | Bader | June 16, 1931 |
| 2,234,623 | Crouse | Mar. 11, 1941 |